US012628163B2

(12) United States Patent
Liu et al.

(10) Patent No.: US 12,628,163 B2
(45) Date of Patent: May 12, 2026

(54) SYSTEMS AND METHODS FOR MANAGING MULTICAST AND UNICAST COMMUNICATIONS

(71) Applicant: ZTE CORPORATION, Nanshan (CN)

(72) Inventors: Xing Liu, Shenzhen (CN); Peng Hao, Shenzhen (CN); Tao Qi, Shenzhen (CN); Jing Shi, Shenzhen (CN); Xingguang Wei, Shenzhen (CN); Lin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 460 days.

(21) Appl. No.: 18/298,649

(22) Filed: Apr. 11, 2023

(65) Prior Publication Data

US 2023/0247633 A1 Aug. 3, 2023

Related U.S. Application Data

(63) Continuation of application No. PCT/CN2020/121087, filed on Oct. 15, 2020.

(51) Int. Cl.
| | |
|---|---|
| *H04W 72/1273* | (2023.01) |
| *H04L 27/26* | (2006.01) |
| *H04W 72/23* | (2023.01) |

(52) U.S. Cl.
CPC ... *H04W 72/1273* (2013.01); *H04L 27/26025* (2021.01); *H04L 27/2605* (2013.01); *H04W 72/23* (2023.01)

(58) Field of Classification Search
CPC ... H04L 5/0094; H04L 5/0037; H04L 5/0053; H04L 27/26025; H04L 27/2605; H04W 72/1273; H04W 72/30; H04W 72/23
See application file for complete search history.

(56) References Cited

U.S. PATENT DOCUMENTS

| | | | |
|---|---|---|---|
| 11,863,492 B2* | 1/2024 | Hu | H04L 1/1896 |
| 2014/0226552 A1 | 8/2014 | Niu et al. | |
| 2014/0355493 A1 | 12/2014 | Niu et al. | |

(Continued)

FOREIGN PATENT DOCUMENTS

| | | |
|---|---|---|
| CN | 110050501 A | 7/2019 |
| CN | 110945940 A | 3/2020 |
| CN | 111052653 A | 4/2020 |

OTHER PUBLICATIONS

Extended European Search Report on EP Appl. No. 20957103.3, dated Oct. 13, 2023 (10 pages).

(Continued)

*Primary Examiner* — Rasheed Gidado
(74) *Attorney, Agent, or Firm* — Foley & Lardner LLP

(57) ABSTRACT

A wireless communication method includes receiving, by a wireless communication device from a network, first downlink control information on a first downlink channel in a first frequency resource. The first downlink control information schedules a first Transport Block (TB). The first downlink channel is specific to the wireless communication device. The method further includes receiving, by the wireless communication device from the network, the first TB on a second downlink channel in a second frequency resource. The first TB is received by a plurality of wireless communication devices. The second downlink channel is common to the plurality of wireless communication devices.

15 Claims, 13 Drawing Sheets

(56) References Cited

U.S. PATENT DOCUMENTS

| | | | |
|---|---|---|---|
| 2019/0021045 A1* | 1/2019 | Kim | H04W 72/23 |
| 2019/0253200 A1 | 8/2019 | Salem et al. | |
| 2019/0373602 A1* | 12/2019 | Qin | H04B 7/0404 |
| 2020/0221505 A1 | 7/2020 | Agiwal et al. | |
| 2020/0267511 A1* | 8/2020 | Abdoli | H04L 5/001 |
| 2021/0234640 A1* | 7/2021 | Cirik | H04L 1/1854 |
| 2022/0078728 A1* | 3/2022 | Yi | H04W 48/16 |
| 2022/0279551 A1* | 9/2022 | Liu | H04W 72/0446 |
| 2023/0050541 A1* | 2/2023 | Yi | H04L 1/1822 |
| 2023/0132212 A1* | 4/2023 | Gao | H04L 1/1812 |
| | | | 370/329 |

OTHER PUBLICATIONS

ZTE, "Consideration for multicast support for NB-IoT", 3GPP TSG RAN WG1 Meeting #86, R1-167325, Aug. 26, 2016, Gothenburg, Sweden (4 pages).

International Search Report and Written Opinion for PCT Appl. No. PCT/CN2020/121087, mailed Jul. 16, 2021 (9 pages).

Lg Electronics Inc.: "Support of group scheduling for RRC_CONNECTED UEs" 3GPP TSG RAN WG1 Meeting #102-e; R1-2006320; Aug. 28, 2020; Online (5 pages).

First Office Action for CN Appl. No. 202080106130.7, dated Jun. 28, 2025 (with English translation, 17 pages).

* cited by examiner

200

|  | Index of Unicast BWP | Index of Multicast BWP |
|---|---|---|
| DL BWP Pair 1 | 1 | 4 |
| DL BWP Pair 2 | 2 | 5 |
| DL BWP Pair 3 | 3 | 5 |

FIG. 7

| Multicast services index | Scheduling DCI for initial transmission of a multicast TB | Scheduling DCI for retransmission of the multicast TB |
|---|---|---|
| #1 | G-RNTI#1 + HPN #0(0000) | HPN #8(1000) |
| #1 | G-RNTI#1 + HPN #1(0001) | HPN #9(1001) |
| #1 | G-RNTI#1 + HPN #2(0010) | HPN #10(1010) |
| #1 | G-RNTI#1 + HPN #3(0011) | HPN #11(1011) |
| #2 | G-RNTI#2 + HPN #0(0000) | HPN #12(1100) |
| #2 | G-RNTI#2 + HPN #1(0001) | HPN #13(1101) |
| #2 | G-RNTI#2 + HPN #2(0010) | HPN #14(1110) |
| #2 | G-RNTI#2 + HPN #3(0011) | HPN #15(1111) |

FIG. 9

| Service type | Scheduling DCI for initial transmission of a multicast TB | Scheduling DCI for retransmission of the multicast TB |
|---|---|---|
| Unicast | C-RNTI + STI#0(00) + HPN#n | C-RNTI + STI#0(00) + HPN#n |
| Multicast #1 | G-RNTI#1 + HPN #0(0000) | STI#1(01) + HPN #0(0000) |
| Multicast #1 | G-RNTI#1 + HPN #1(0001) | STI#1(01) + HPN #1(0001) |
| Multicast #1 | G-RNTI#1 + HPN #2(0010) | STI#1(01) + HPN #2(0010) |
| Multicast #1 | G-RNTI#1 + HPN #3(0011) | STI#1(01) + HPN #3(0011) |
| Multicast #2 | G-RNTI#2 + HPN #0(0000) | STI#2(10) + HPN #0(0000) |
| Multicast #2 | G-RNTI#2 + HPN #1(0001) | STI#2(10) + HPN #1(0001) |
| Multicast #2 | G-RNTI#2 + HPN #2(0010) | STI#2(10) + HPN #2(0010) |
| Multicast #2 | G-RNTI#2 + HPN #3(0011) | STI#2(10) + HPN #3(0011) |

FIG. 10

| Multicast services index | Scheduling DCI for initial transmission of a multicast TB | Scheduling DCI for retransmission of the multicast TB |
|---|---|---|
| #1 | G-RNTI#1 + HPN #0(0000) | SSTI0 + MSI#1 + HPN #0(0000) |
| #1 | G-RNTI#1 + HPN #1(0001) | SSTI0 + MSI#1 + HPN #1(0001) |
| #1 | G-RNTI#1 + HPN #2(0010) | SSTI0 + MSI#1 + HPN #2(0010) |
| #1 | G-RNTI#1 + HPN #3(0011) | SSTI0 + MSI#1 + HPN #3(0011) |
| #2 | G-RNTI#2 + HPN #0(0000) | SSTI0 + MSI#2 + HPN #0(0000) |
| #2 | G-RNTI#2 + HPN #1(0001) | SSTI0 + MSI#2 + HPN #1(0001) |
| #2 | G-RNTI#2 + HPN #2(0010) | SSTI0 + MSI#2 + HPN #2(0010) |
| #2 | G-RNTI#2 + HPN #3(0011) | SSTI0 + MSI#2 + HPN #3(0011) |

FIG. 11

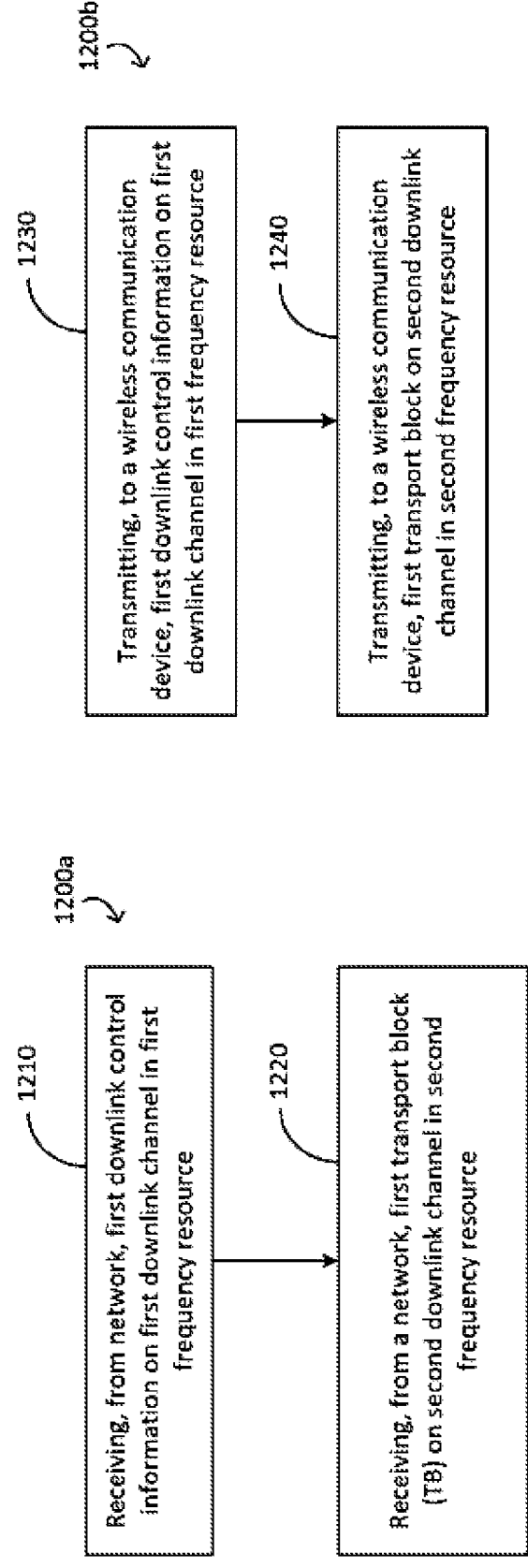

1200b

1230 — Transmitting, to a wireless communication device, first downlink control information on first downlink channel in first frequency resource 1240 — Transmitting, to a wireless communication device, first transport block on second downlink channel in second frequency resource

1210 — Receiving, from network, first downlink control information on first downlink channel in first frequency resource 1220 — Receiving, from a network, first transport block (TB) on second downlink channel in second frequency resource

FIG. 12A

SYSTEMS AND METHODS FOR MANAGING MULTICAST AND UNICAST COMMUNICATIONS

CROSS-REFERENCE TO RELATED APPLICATION

This application claims the benefit of priority under 35 U.S.C. § 120 as a continuation of PCT Patent Application No. PCT/CN2020/121087, filed on Oct. 15, 2020, the disclosure of which is incorporated herein by reference in its entirety.

TECHNICAL FIELD

The disclosure relates generally to wireless communications and, more particularly, to systems and methods for simultaneous unicast and multicast transmission.

BACKGROUND

Under multicast mode, the same transmission mechanism is used by the network node (e.g., base station) for transmitting the same information to a group of User Equipment (UEs). The multicast transmission can be carried on a Physical Data Shared Channel (PDSCH), which is received by the group of UEs. This PDSCH carrying the multicast Transport Block (TB) can be referred to as group common PDSCH or multicast PDSCH. Specifically, there are various network environments (e.g., channel conditions) for different UEs. In order to improve the efficiency of multicast transmission, UEs with similar network environments are expected to be classified into one UE group. Then, the transmission mechanism selected is better matched to the network environment of each UE in the UE group.

There are different ways for scheduling the PDSCH for a group of UEs receiving the same PDSCH for a multicast TB. One way is to use a group common Physical Downlink Control Channel (PDCCH), such that all UEs in the group will detect the same PDCCH, and the PDSCH will be scheduled by the PDCCH. Another way is to use a UE-specific PDCCH for each of the UEs in the group, such that each of the UEs will detect its own PDCCH, and the different PDCCHs will schedule the same PDSCH.

For multicast TB/PDSCH scheduled by a Downlink Control Information (DCI) carried on UE-specific PDCCH, there will be different configuration parameters for unicast transmission and multicast transmission. Therefore, it is important to distinguish a unicast or multicast transmission scheduled by a DCI carried on UE-specific PDCCH, which rule should be followed on the DCI size determination, and how to descramble the group common PDSCH, among other issues.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a wireless communication method includes receiving, by a wireless communication device from a network, first downlink control information on a first downlink channel in a first frequency resource; wherein the first downlink control information schedules a first Transport Block (TB), the first downlink channel is specific to the wireless communication device, and receiving, by the wireless communication device from the network, the first TB on a second downlink channel in a second frequency resource, the first TB received by a plurality of wireless communication devices, the second downlink channel being common to the plurality of wireless communication devices.

In other embodiments, a wireless communication method includes transmitting, by a network to a wireless communication device, first downlink control information on a first downlink channel in a first frequency resource, wherein the first downlink control information schedules a first Transport Block (TB), the first downlink channel is specific to the wireless communication device, and transmitting, by the network to a plurality of wireless communication devices comprising the wireless communication device, the first TB on a second downlink channel in a second frequency resource, and the second downlink channel being common to the plurality of wireless communication devices.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 7 is a table for DL BWP pairs of unicast BWPs and multicast BWPs, according to various embodiments.

FIG. 9 is a table for values of scheduling DCI relative to multicast services indexes, according to various embodiments.

FIG. 10 is a table for values of scheduling DCI relative to service type, according to various embodiments.

FIG. 11 is a table for values of scheduling DCI relative to multicast services index, according to various embodiments.

FIG. 12A is a flowchart diagram illustrating an example wireless communication method for sidelink discontinuous reception configuration, according to various arrangements.

FIG. 12B is a flowchart diagram illustrating an example wireless communication method for sidelink discontinuous reception configuration, according to various arrangements.

DETAILED DESCRIPTION

Figure 1:
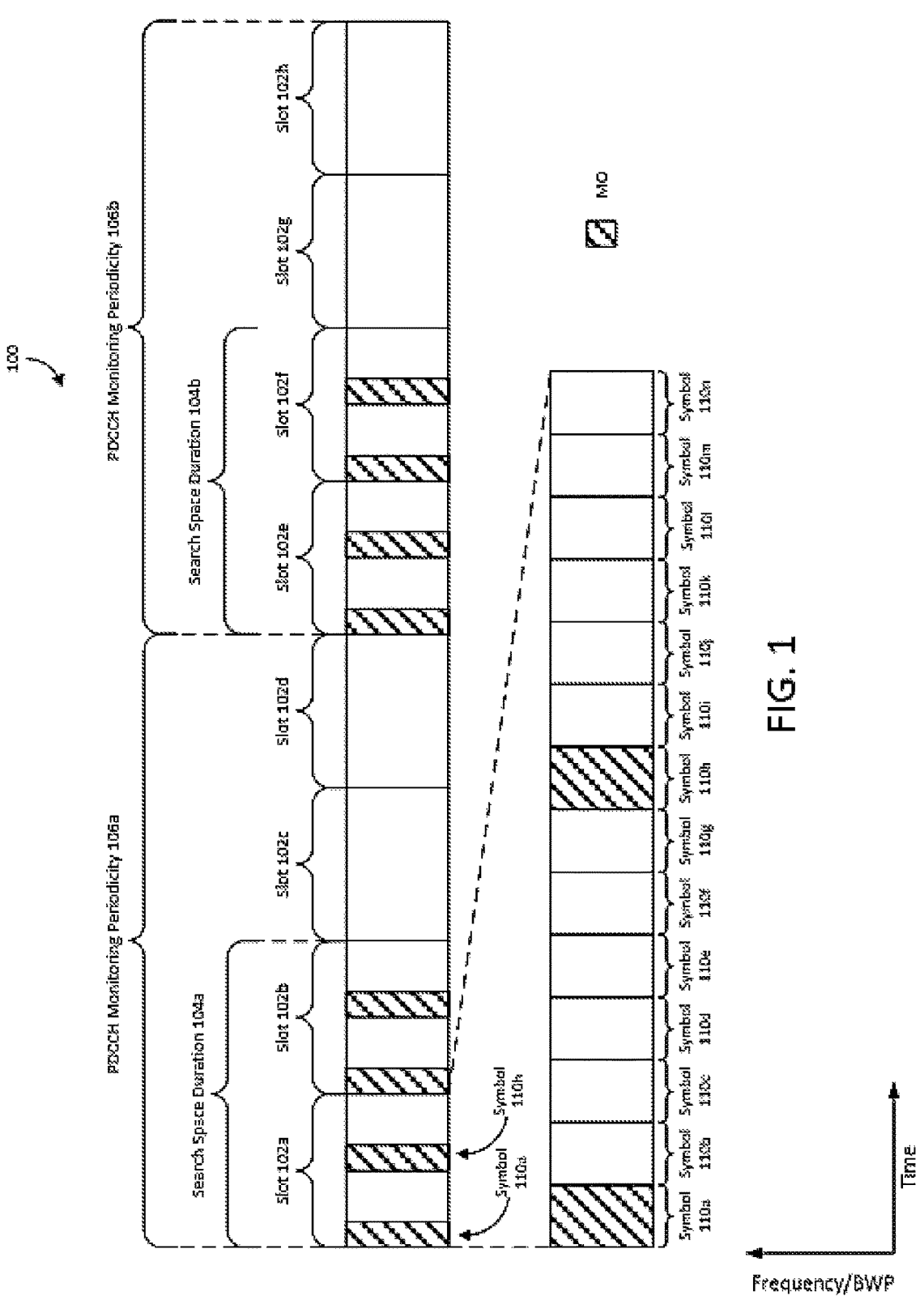
FIG. 1 is a diagram illustrating a slot structure corresponding to an example configuration 100 of PDCCH monitoring occasions, according to various embodiments.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Developments in 5G wireless communication systems are directed to achieving higher data communicate rate (e.g., in Gbps), massive number of communication links (e.g., 1 M/Km$^2$), ultra-low latency (e.g., under 1 ms), higher reliability, and improved energy efficiency (e.g., at least 100 times more efficient than previous systems). To achieve such improvements, multicast TB can be carried on a group common PDSCH scheduled by a DCI carried on a PDCCH. There are multiple ways for multicast TB scheduling.

One way to schedule multicast TB is to use a DCI carried on a group common PDCCH, such that all UEs in a group will detect the same PDCCH for receiving the PDSCH. The group common PDCCH is scrambled by corresponding group common Radio Network Temporary Identifier (RNTI) configured via Radio Resource Control (RRC) signaling. The PDSCH can also be scrambled by the same group common RNTI or another group common RNTI similarly configured by RRC signaling. Another way to schedule multicast TB is to use a DCI carried on a UE-specific PDCCH for each of the UEs in the group. Specifically, each of the UEs will detect its own PDCCH, and the different DCI carried on different PDCCHs will schedule the same PDSCH. The DCI carried on UE-specific PDCCH can also be used for scheduling PDSCH carrying a unicast TB. The monitoring information of "group common PDCCH" or "UE-specific PDCCH," such as the search space set configuration and Control Resource Set (CORESET) configuration can be indicated in system information or in UE-specific RRC signaling.

In wireless communication system, a control resource set (CORESET) includes one or more resource blocks (RBs) in the frequency domain and one or more orthogonal frequency division multiplexing (OFDM) symbols in the time domain. One or more PDCCH candidates are transmitted in a CORESET. The configuration parameters of CORESET are configured by the network for a UE, including CORESET index, frequency domain resource, CORESET duration, etc. One or more CORESETs may be configured for a UE for monitoring PDCCH.

In a wireless communication system, one or more search space sets are configured by the network for a UE. The configuration parameters of a search space set include search space index, associated CORESET index, PDCCH monitoring periodicity and offset, search space duration, PDCCH monitoring pattern within a slot, search space type, etc. In general, there are two types of search space: UE-specific search space (USS) and common search space (CSS). A search space type also indicates the downlink control information (DCI) formats that a UE monitors. A search space set is associated with a CORESET. PDCCH monitoring periodicity and offset indicate the slots on which a UE needs to monitor PDCCH. According to a search space set configuration and the associated CORESET configuration, a UE is configured to monitor corresponding PDCCH with DCI formats indicated by the search space type on the resources indicated by the CORESET in the slots indicated by the PDCCH monitoring periodicity and offset.

FIG. 1 is a diagram illustrating a slot structure corresponding to an example configuration 100 of PDCCH monitoring occasions, according to various embodiments. Referring to FIG. 1, the configuration 100 has eight slots, denoted as slots 102a, 102b, 102c, 102d, 102e, 102f, 102g, and 102h (collectively the slots 102a-102h). In FIG. 1, the x-axis corresponds to time, and the y-axis corresponds to frequency or BWP. A PDCCH monitoring periodicity is a periodicity by which a UE monitors PDCCH. In the configuration 100, the PDCCH monitoring periodicity is 4 slots. That is, the slots 102a-102d are in a PDCCH monitoring periodicity 106a, and the slots 102e-102h are in a PDCCH monitoring periodicity 106b. The PDCCH monitoring offset in the configuration 100 is 0 (e.g., no offset). A search space duration in the configuration 100 is 2 slots. As shown, within the PDCCH monitoring periodicity 106a, a search space duration 104a includes slots 102a and 102b. Within the PDCCH monitoring periodicity 106b, a search space duration 104b includes slots 102e and 102f. In the configuration 100, 2 PDCCH Monitoring Occasions (MOs) are configured in a given slot within the search duration 104a or 104b. For example, the slot 102a includes 44 OFDM symbols 110a, 110b, 110c, 110d, 110e, 110f, 110g, 110h, 110i, 110j, 110k, 110l, 110m, and 110n (collectively symbols 110a-110n). Symbols 110a and 110h are configured as first symbols of MOs. Therefore, there are 4 total MOs within each PDCCH monitoring period. For instance, the symbols 110a and 110h as well as two additional first symbols of MOs in the slot 102b are within PDCCH monitoring periodicity 106a. Two first symbols of MOs in each of slots 102e and 102f are within PDCCH monitoring periodicity 106b. In each of MO, the UE monitors PDCCH within one resource configured via CORESET.

In a wireless communication system, there are one or more PDCCH candidates in one search space. Each PDCCH candidate has a PDCCH candidate index. A PDCCH consists of one or more Control-Channel Elements (CCEs), each of which have a CCE index.

Typically, a unicast TB carried on PDSCH is scheduled within an active Downlink (DL) Bandwidth Part (BWP) (e.g., with BWP index #1), such that an active BWP is a part of carrier bandwidth used for service transmitting. A UE can be configured for more than one DL BWP, but only one DL BWP can be active at a certain moment. The scheduling PDCCH is also located within the active DL BWP.

According to an example embodiment, the UE receives first downlink control information (e.g., DCI) on a first downlink control channel (e.g., PDCCH), which is UE-specific, in a first frequency resource (e.g., a first BWP). In some embodiments, the DCI and the PDCCH is characterized as UE-specific given that a UE-specific RNTI (e.g., C-RNTI) is scrambling with the CRC of the first DCI. This first downlink control information schedules a first TB. The UE then receives this first TB on a second downlink channel (e.g., PDSCH), which is common to many different UEs, in a second frequency resource (e.g., a second BWP). This first TB is received by many different UEs. In some embodiments, the first TB and the second downlink channel is common to the different UEs given that a group common RNTI (e.g., G-RNTI) is used for initialize the scrambling sequence of the second downlink channel.

Multiple embodiments are directed to this method for simultaneous transmission of unicast and multicast TB. A first embodiment is directed to a method of multicast PDSCH transmitted from unicast mode. In this embodiment, a unicast TB carried on PDSCH is scheduled within an active DL BWP (e.g., with BWP index #1), and a multicast TB is scheduled within a multicast-specific active DL BWP (e.g., with BWP index #2). For a UE receiving both unicast and multicast TBs simultaneously, the UE is required to activate both BWP1 and BWP2 together.

Figure 2:
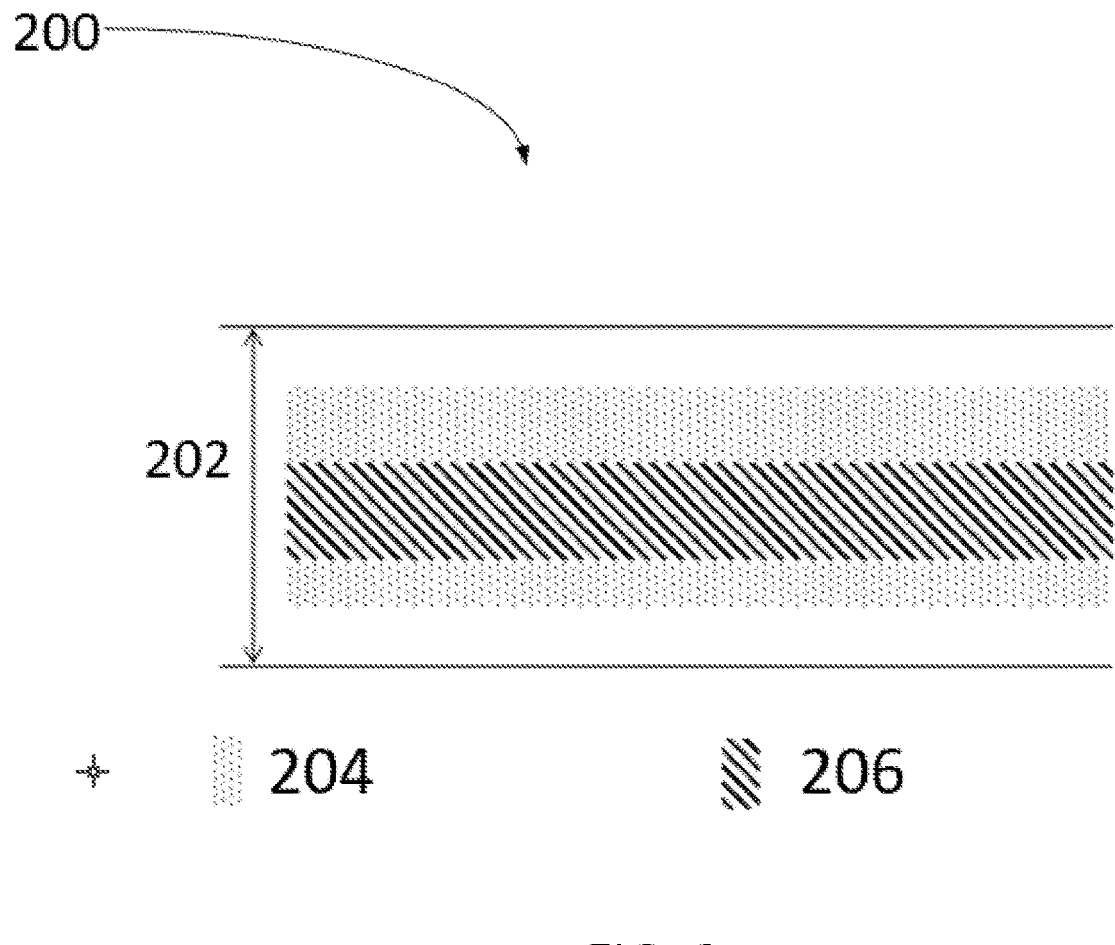
FIG. 2 is a schematic diagram illustrating a DL BWP pair for simultaneous unicast and multicast transmissions, according to various embodiments

FIG. 2 is a schematic diagram illustrating a DL BWP pair for simultaneous unicast and multicast transmissions, according to various embodiments. In FIG. 2, the x-axis corresponds to time, and the y-axis corresponds to frequency or BWP. As shown in FIG. 2, a carrier 202 contains a first BWP (BWP1) 204 and a second BWP (BWP2) 206. BWP1 204 is a DL BWP for unicast, while BWP2 206 is a DL BWP for multicast. As such, BWP1 204 and BWP2 206 can be considered as a DL BWP pair for unicast and multicast service transmission respectively. The above BWPs can be activated separately or simultaneously. The BWPs in one DL BWP pair need to meet a certain restriction (e.g., at least one of a frequency range of multicast BWP being located within the frequency range of unicast BWP, same SubCarrier Spacing (SCS) for both multicast BWP and unicast BWP, and same Cyclic Prefix (CP) for both multicast BWP and unicast BWP). Then, some of the BWP configuration parameters can be shared by BWPs in one BWP pair, including but not limited to SCS, CP, etc. As shown in FIG. 2, BWP2 206 may be contained entirely within BWP1 204 and share the same CP and SCS. In other embodiments (not shown), BWP2 206 may be partially within BWP1 204, or not within BWP1 204 at all.

Both the unicast TB and the multicast TB can be scheduled by a DCI carried on UE-specific PDCCH. The UE-specific PDCCH are transmitted within BWP1, and the format of the DCI can be DCI format 1_1 or DCI format 1_2. The "Bandwidth Part Indicator" field in the DCI can be used to indicate whether the scheduled PDSCH is carrying a unicast TB or a multicast TB. For example, if the value of the Bandwidth Part Indicator field is equal to a certain value, the scheduled PDSCH is carrying a multicast TB. This certain value can be pre-defined or can correspond to a multicast BWP or to a multicast frequency resource, either of which are used for multicast service transmission. Specifically, if the Bandwidth Part Indicator field indicates a BWP in a DL BWP pair (i.e., the BWP carrying the PDCCH and BWP carrying the PDSCH are in a DL BWP pair), there will be no BWP switching delay between data reception in one BWP and data reception in another BWP.

As such, in this embodiment, if the "Bandwidth Part Indicator" field indicates BWP index #2, the scheduled PDSCH is in BWP2 and is carrying a multicast TB. Otherwise, if the Bandwidth Part Indicator field indicates BWP index #1, the scheduled PDSCH is in BWP1 and is carrying a unicast TB accordingly. When the multicast TB is received in BWP2, the configuration of the downlink resource is according to the BWP2.

The RNTI used for initializing the scrambling sequence of scheduled PDSCH is determined according to the Bandwidth Part Indicator field or to the type of TB (i.e., unicast or multicast) carried on the PDSCH. For BWP2, a multicast TB is scheduled and carried on a group common PDSCH in BWP2, and then the scrambling sequence of scheduled PDSCH is initialized with a group common RNTI. The group common RNTI can be a BWP-specific RNTI configured by RRC signaling or can be a multicast-specific RNTI configured by RRC signaling or defined in the specification. Otherwise, a unicast TB is scheduled and carried on a group common PDSCH in BWP1, and then the scrambling sequence of scheduled PDSCH is initialized with a Cell Radio Network Temporary Identifier (C-RNTI) of the scheduled UE.

Correspondingly, when a UE descrambles the PDSCH scheduled by a DCI carried on a UE-specific PDCCH, the UE will determine the RNTI used for initializing the scrambling sequence of scheduled PDSCH according to the 'Bandwidth Part Indicator' field or to the type of TB (i.e., unicast or multicast) carried on the PDSCH.

Figure 3:
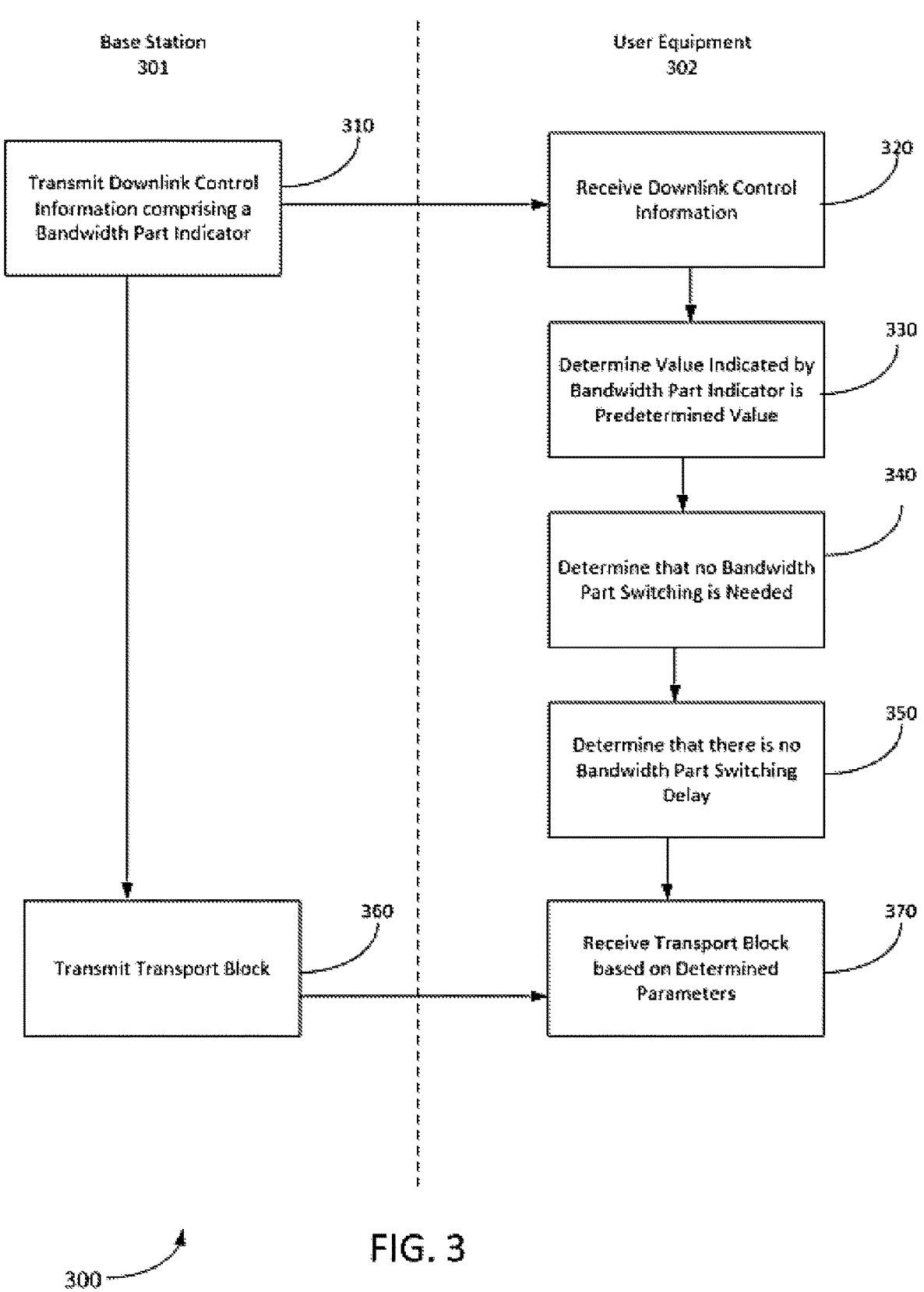
FIG. 3 is a flowchart diagram illustrating an example method for determining BWP switching and BWP switching delay, according to various embodiments.

FIG. 3 is a flowchart diagram illustrating an example method 300 for determining BWP switching and BWP switching delay according to this first embodiment. As shown in FIG. 3, the method 300 is performed by a Base Station (BS) 301 and a UE 302. At 310, the BS 301 transmits DCI comprising a BWP indicator to the UE 302. At 320, the UE 302 receives the DCI on a first BWP, and, at 330, determines that the value indicated by the BWP indicator is equal to a pre-determined value. If so, the method 300 proceeds to 340 where the UE 302 determines that no BWP switching is needed from the first BWP and a second BWP, in which the UE 402 received a TB scheduled by the DCI, and to 350 where the UE 302 determines that there is no BWP switching delay between the first BWP and the second BWP. Then, at 360, the BS 301 transmits the TB, which is received by the UE 302 at 370 based on the determined parameters.

A second embodiment is directed to a method for size determination of DCI carried on UE-specific PDCCH scheduling a multicast PDSCH. The size of DCI for scheduling the PDSCH can always be determined according to the configuration of unicast BWP, regardless of whether the PDSCH is carrying a unicast TB or a multicast TB. Specifically, the information fields contained in DCI and the size of each information field are determined by the configuration of unicast BWP.

In those situations in which the DCI is scheduling a multicast TB, there may be some redundant bits or values for some of the information fields. For example, the size of the Frequency Domain Resource Allocation (FDRA) field is determined according to the number of RBs in unicast BWP. More specifically, the size of the FDRA field can be determined according to the following formula for frequency domain resource allocation type 1:

$$\lceil \log_2(N_{RB}^{DL,BWP}(N_{RB}^{DL,BWP} + 1)/2)\rceil \qquad (1)$$

where $$N_{RB}^{DL,BWP}$$

is the size of the unicast BWP (i.e., number of RBs in unicast BWP). For multicast PDSCH, the frequency domain resources should be allocated within the multicast BWP, which may be smaller than the size of the unicast BWP.

There are two methods for multicast PDSCH frequency resource domain allocation. In a first method, the size of the FDRA field is determined according to the bandwidth of unicast BWP, and the RBs indicated by the FDRA field are limited within the multicast BWP. As such, some values of the FDRA field will be redundant values for multicast PDSCH scheduling and are avoided. In a second method, the size of the FDRA field (given as N bits) is determined according to the bandwidth of unicast BWP. The required number of bits is M, according to the bandwidth of multicast BWP. Then, the lower M bits (i.e., M Least Significant Bits (LSBs)) of the total N bits are used as the frequency domain resource allocation for multicast transmission, and the higher (N-M) bits (i.e., N-M Most Significant Bits (MSBs)) are padded by zeros. As such, some bits of the FDRA field are redundant bits for multicast PDSCH scheduling. Similar processing methods can also be used for other information fields in DCI carried on UE-specific PDCCH.

Figure 4:
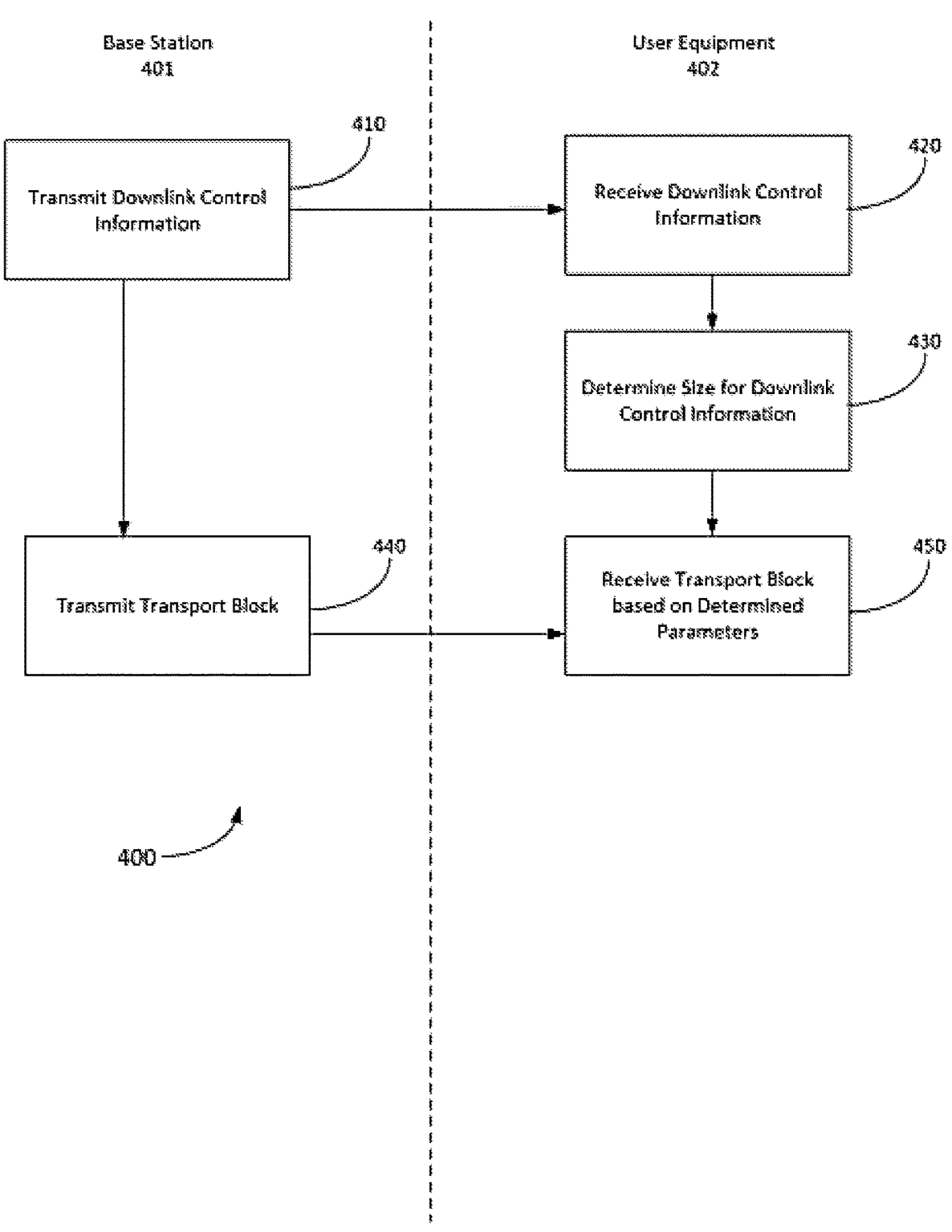
FIG. 4 is a flowchart diagram illustrating an example method 400 for determining a size of the DCI, according to various embodiments.

FIG. 4 is a flowchart diagram illustrating an example method 400 for determining a size of the DCI according to this second embodiment. As shown in FIG. 4, the method 400 is performed by a BS 401 and a UE 402. The method 400 begins at 410, where the BS 401 transmits DCI to the UE 402. At 420, the UE receives the DCI in a BWP and, at 430, determines a size for the DCI based on the configurations of the BWP. Then, at 430, the BS 401 transmits the TB, which is received by the UE 402 at 450 based on the determined parameters.

A third embodiment is directed to another method of size determination of DCI carried on UE-specific PDCCH scheduling a multicast PDSCH. The size of DCI carried on UE-specific PDCCH can be determined according to configurations of unicast BWP and multicast BWP, respectively. As such, there may be two different DCI sizes for a same DCI format within a search space set. One DCI size is used for unicast PDSCH scheduling, the other DCI size is used for multicast PDSCH scheduling, and potential DCI size alignment can be executed by the UE between the two different DCI sizes.

For DCI size alignment, there are different DCI formats with different functions. For example, DCI format 1_0/1_1/1_2 is used for DL scheduling, DCI format 0_0/0_1/0_2 is used for UL scheduling, DCI format 2_0 is used for Slot Format Indication (SFI), DCI format 2_1 is used for pre-emption indication, DCI format 2_2/2_3 is used for power control, DCI format 2_4 is used for UL cancelation indication, etc. Each may have different sizes, but the capability of UE for Blind Detecting (BD) DCI is limited, as there are only 4 different DCI sizes that can be monitored by a UE for a single cell and the number of different sizes of DCI format with Cyclic Redundancy Check (CRC) scrambled by C-RNTI cannot exceed 3. The limitation of BD can be referred to as DCI size budget. If the number of DCI sizes exceeds the DCI size budget, DCI size alignment between different DCI formats should be made.

There are 4 methods that can be used for DCI size alignment. Alignment refers to each of the sizes being the same size (e.g., if A aligns with B, then the size of A is equal to the size of B). In a first method, the size of DCI scheduling unicast PDSCH always aligns with the size of the same DCI format for scheduling multicast PDSCH. In a second method, the size of DCI scheduling multicast PDSCH always aligns with the size of the same DCI format for scheduling unicast PDSCH. In a third method, the size of the DCI always aligns with the maximum size among the DCI scheduling unicast PDSCH and DCI scheduling multicast PDSCH. In a fourth method, if the number of DCI formats with different sizes do not exceed the DCI size budget, the two do not need to be aligned. If the number of DCI formats with different sizes do exceed the DCI size budget, one of the first, second, or third method should be used for aligning the size of the same DCI format for scheduling unicast PDSCH and multicast PDSCH.

Figure 5:
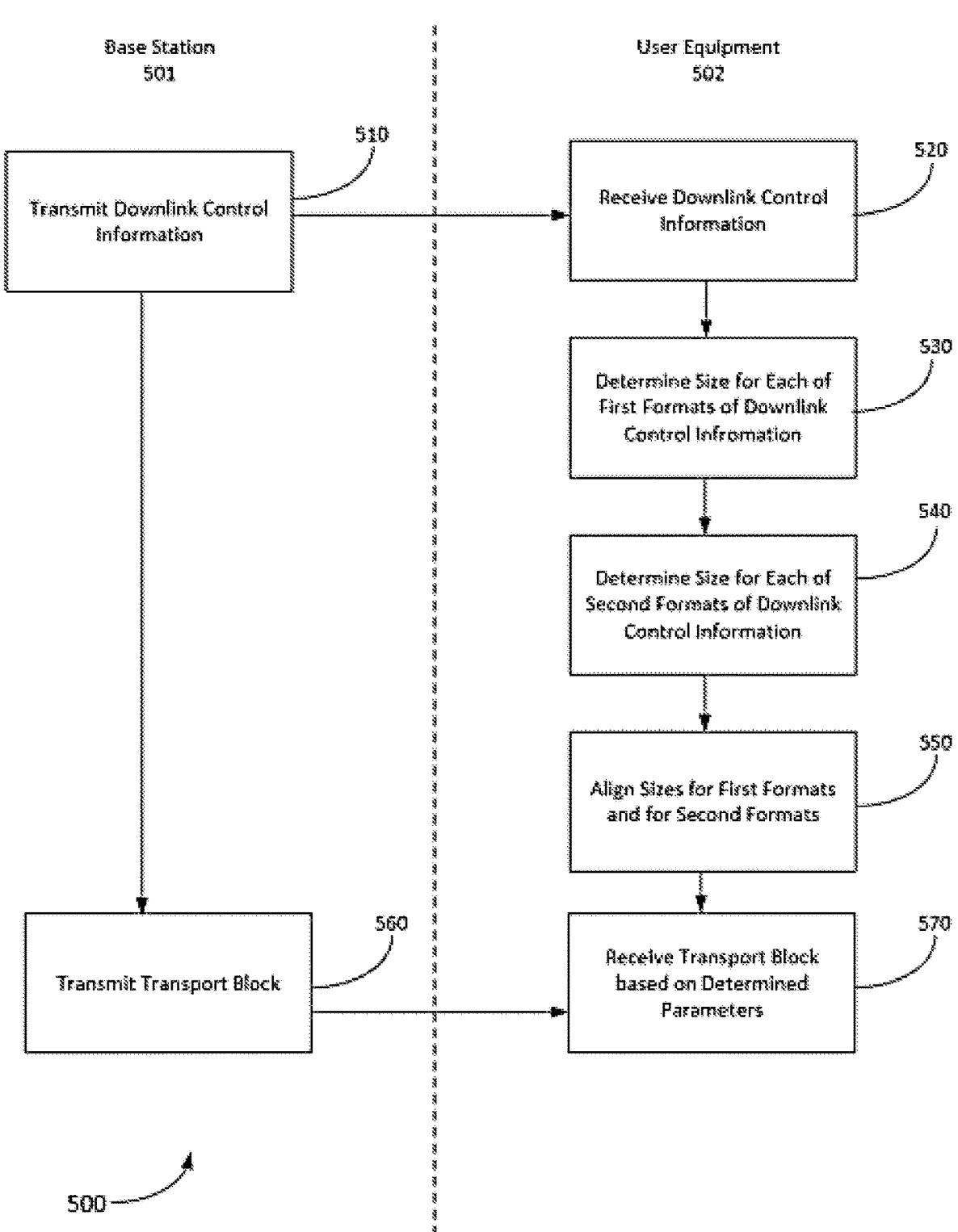
FIG. 5 is a flowchart diagram illustrating an example method for aligning unicast and multicast resources in DCI, according to various embodiments.

FIG. 5 is a flowchart diagram illustrating an example method 500 for aligning unicast and multicast resources in DCI, according to this third embodiment. As shown in FIG. 5, the method 500 is performed by a BS 501 and a UE 502. The method 500 begins at 510, where the BS 501 transmits DCI in a first BWP to the UE 502. At 520, the UE 502 receives the DCI, which schedules a TB in a second BWP. At 530, the UE determines a size for the formats of the DCI that are used for scheduling unicast PDSCH. At 540, the UE determines a size for the formats of the DCI that are used for scheduling multicast PDSCH. At 550, the UE aligns the size for the unicast formats and the multicast formats. Then, at 560, the BS 501 transmits the TB, which is received by the UE 502 at 570 based on the determined parameters.

A fourth embodiment is directed to a method of size determination of DCI carried on group common PDCCH scheduling a multicast PDSCH. For a multicast PDSCH scheduled by a DCI carried on a group common PDCCH (i.e., all UEs in a group will detect the same PDCCH for receiving the multicast PDSCH), the group common PDCCH is carrying a DCI format with CRC scrambled by corresponding group common RNTI configured via RRC signaling. The scrambling sequence of PDSCH can be initialized by the same group common RNTI, or another group common RNTI also configured by RRC signaling. In this embodiment, in addition to the first multicast TB scheduled by the first downlink information, a unicast TB and a second multicast TB are scheduled by second and third downlink information received by the UE from the BS.

Different UEs in the group should have a common understanding on the size of DCI for scheduling the multicast PDSCH. For each UE, if the group common PDCCH reuse DCI format for unicast PDSCH scheduling, then the size alignment of a same DCI format for scheduling unicast PDSCH and multicast PDSCH should be further considered. Considering that DL scheduling DCI (e.g., DCI format 1_0/1_1/1_2) for unicast are reused by group common PDCCH for scheduling a multicast PDSCH, there are three methods for DCI size alignment. In a first method, the size of DCI scheduling unicast PDSCH always aligns with the size of the same DCI format for scheduling multicast PDSCH. For example, DCI format 1_0 can be used for scheduling both unicast PDSCH and multicast PDSCH. The DCI size will be determined according to multicast BWP configuration. If a smaller size is needed for scheduling unicast PDSCH, the DCI size is padded by zero to align the size with DCI format 1_0 for multicast PDSCH scheduling. If a larger size is needed for scheduling unicast PDSCH, the DCI size is truncated according to a pre-defined rule to align the size with DCI format 1_0 for multicast PDSCH scheduling.

In a second method, the size of DCI for scheduling both unicast PDSCH always align with a reference DCI size with a same DCI format, where the reference DCI size is defined in the specification or configured by RRC signaling. The reference DCI size is defined per DCI format. For example, a reference DCI size for DCI format 12 is pre-defined. If a unicast PDSCH or a multicast PDSCH is scheduled by DCI format 1_2, the size will be aligned with the reference DCI size predefined for DCI format 1_2.

In a third method, if the number of DCI formats with different sizes does not exceed the DCI size budget, the DCI size for scheduling unicast PDSCH and multicast does not need to be aligned. If the number of DCI formats with different sizes does exceed the DCI size budget, one of the first or second method should be used for aligning the size of same DCI format for scheduling PDSCH and multicast PDSCH.

Figure 6:
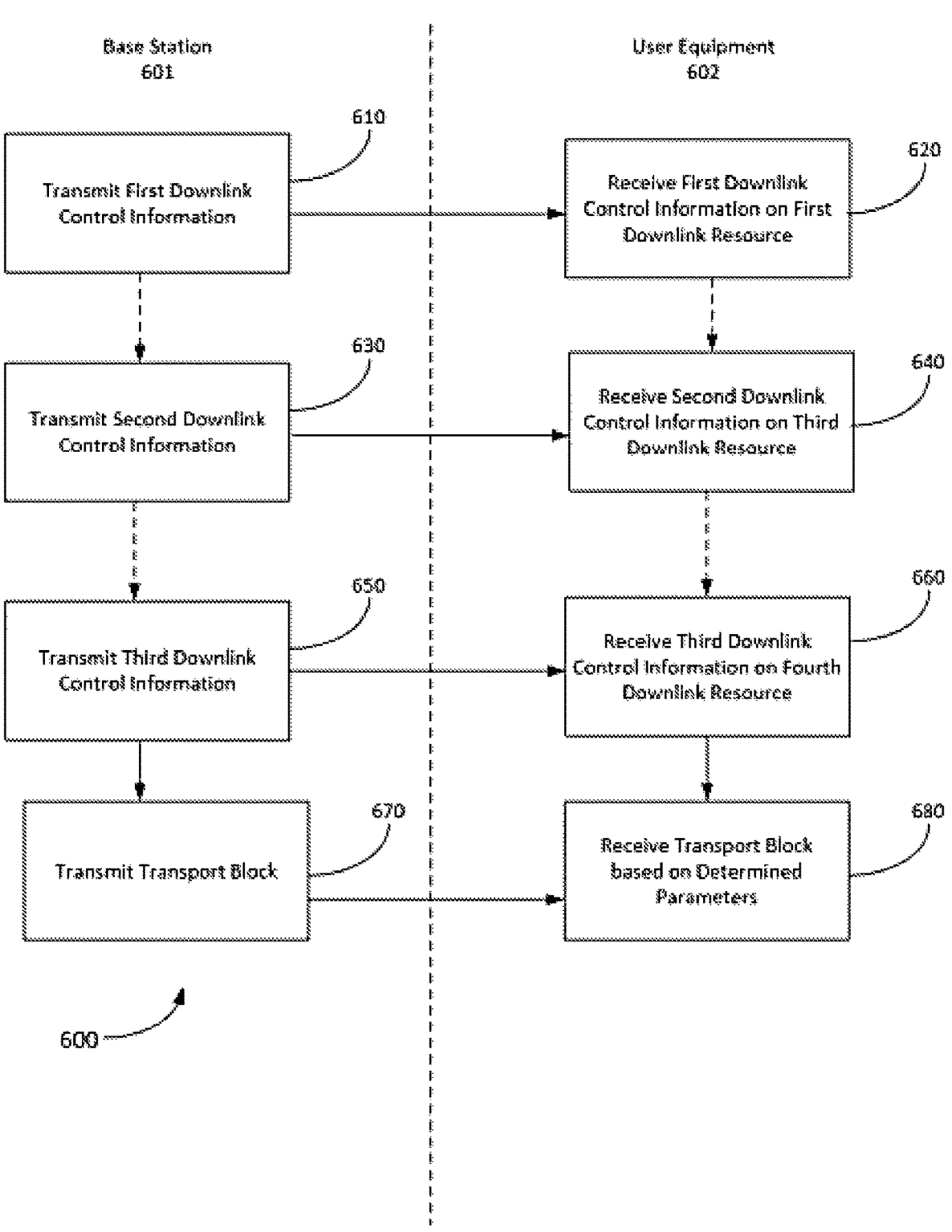
FIG. 6 is a flowchart diagram illustrating an example method for scheduling multiple TBs, according to various embodiments.

FIG. 6 is a flowchart diagram illustrating an example method 600 for scheduling multiple TBs, according to this fourth embodiment. As shown in FIG. 6, the method 600 is performed by a BS 601 and a UE 602. The method 600 begins at 610, where the BS 601 transmits first DCI to the UE 602. At 620, the UE 602 receives the first DCI on a first DL resource, which schedules a first multicast TB. Then, at 630, the BS 601 transmits second DCI on a third DL resource to the UE 602. At 640, the UE 602 receives the second DCI, which schedules a unicast TB. At 650, the BS 601 transmits a third DCI on a fourth DL resource to the UE 602. At 660, the UE 602 receives the third DCI, which schedules a second multicast TB. Then, at 670, the BS 601 transmits the TB, which is received by the UE 602 at 680 based on the determined parameters.

A fifth embodiment is directed to an indication method of multicast PDSCH transmitted from unicast mode. The mapping relationship between unicast BWP and multicast BWP can be configured by RRC signaling and may be bundled as a DL BWP pair. The unicast BWP and multicast BWP in a single DL BWP pair will switch together. That is, if an active unicast BWP is switching to another active unicast BWP, the active multicast BWP will be switched accordingly. FIG. 7 is a table for DL BWP pairs of unicast BWPs and multicast BWPs, according to various embodiments. As shown in FIG. 7, there are three pairs of DL BWPs. If active unicast BWP is switched from 1 to 2 (i.e. from a second frequency resource to a fourth frequency resource), the active multicast BWP will be switched from 4 to 5 (i.e., from a first frequency resource to a third frequency resource). Moreover, the same multicast BWP can associate with more than one unicast BWP. For example, multicast BWP 5 can be associated with unicast BWP2 and BWP3. If active unicast BWP is switched from 2 to 3, the active multicast BWP will not be switched. Put differently, if the unicast BWP is switched and the current Multicast or Broadcast Service (MBS) BWP is still in the new unicast BWP, then the MBS BWP does not need to be switched. In contrast, if the MBS BWP is not in the new unicast BWP, then the MBS BWP must be switched to a MBS BWP that is in the new unicast BWP.

Alternatively, the unicast BWP may be switched based on the multicast BWP. For example, if the multicast BWP switches from a first multicast resource to a second multicast resource, but the current unicast resource is not entirely within the second multicast resource (i.e., at least a portion of the current unicast resource is not within the second multicast resource), the current unicast resource will switch to a unicast resource within the second multicast resource. In contrast, if the current unicast resource is entirely within the second multicast resource, the current unicast resource will not switch.

A multicast PDSCH may be scheduled by both DCI carried on UE-specific PDCCH and DCI carried on group common PDCCH. For the PDSCH scheduling with DCI carried on UE-specific PDCCH pointing to multicast BWP, continuous FDRA is adopted by default. In the case of a multicast PDSCH scheduled by DCI carried on UE-specific PDCCH, if some certain conditions are met, the UE will continuously monitor the UE-specific PDCCH in unicast BWP. When these certain conditions are not met, the UE switches to multicast BWP for monitoring DCI on multicast BWP. The DCI on multicast BWP can be carried on group common PDCCH or UE-specific PDCCH. These certain conditions include at least one of a) multicast BWP being located within unicast BWP; b) the SCS of multicast BWP being the same as that of unicast BWP; c) the CP type of multicast BWP being the same as that of unicast BWP; d) the center frequency of multicast BWP being the same as that of unicast BWP; and e) the bandwidth of multicast BWP being the same as that of unicast BWP. Alternatively, if at least a portion of the multicast BWP is located outside of the unicast BWP or the SCS of the multicast BWP is different than the SCS of the unicast BWP, the CP of the multicast BWP is different than the CP of the unicast BWP, the center frequency of the multicast BWP is different than the center frequency of the unicast BWP, or if the bandwidth of the multicast BWP is different than the bandwidth of the unicast BWP, then the UE will monitor a different downlink channel (e.g., a group common PDCCH).

Figure 8:
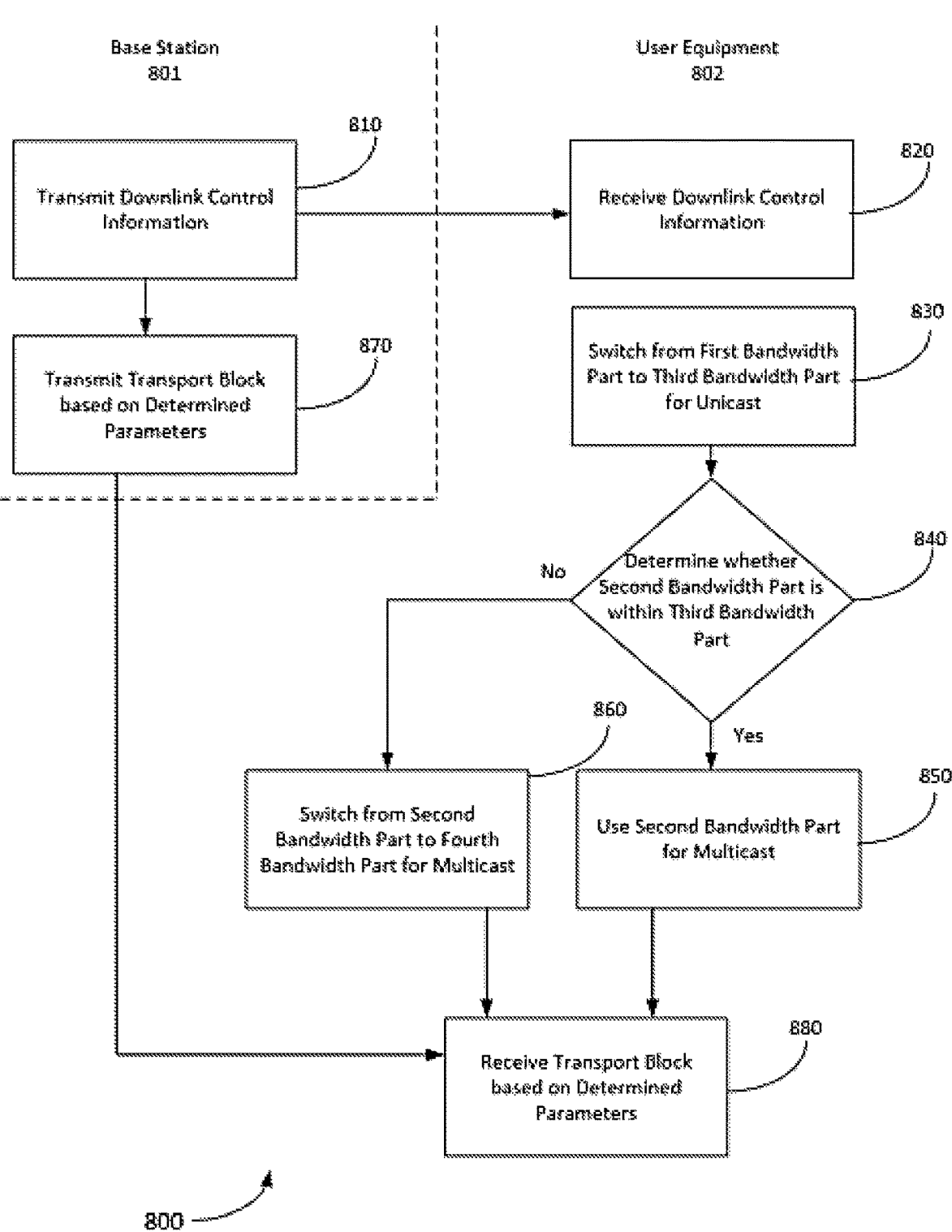
FIG. 8 is a flowchart diagram illustrating an example method for determining BWP switching, according to various embodiments.

FIG. 8 is a flowchart diagram illustrating an example method 800 for determining BWP switching, according to this fifth embodiment. As shown in FIG. 8, the method 800 is performed by a BS 801 and a UE 802. The method 800 begins at 810, where the BS 801 transmits DCI to the UE 802 in a first BWP. At 820, the UE 802 receives the DCI, which schedules a multicast TB in a second BWP. At 830, the UE 802 switches from the first BWP to a third BWP. At 840, the UE 802 determines whether the second BWP is wholly within the third BWP. If the second BWP is within the third BWP (840:YES), the UE 802 uses the second BWP for multicast services. If at least some part of the second BWP is outside of the third BWP (840:NO), the UE 802 switches from the second BWP to a fourth BWP to use for multicast services. Then, at 870, the BS 801 transmits the TB, which is received by the UE 802 at 880 based on the determined parameters (either from 850 or 860).

A sixth embodiment is directed to a method for indicating multicast TB in DCI carried on UE-specific PDCCH. In some embodiments, the initial transmission of a multicast TB is scheduled by a DCI carried on group common PDCCH, such that the CRC of the DCI is scrambled by a group common RNTI (e.g., G-RNTI) configured by RRC signaling. In this embodiment, different multicast services will be configured with different G-RNTIs, such that multicast service and G-RNTI have a one-to-one mapping relationship. For each multicast service, there are one or more HARQ processes. For example, a multicast service contains 4 HARQ processes with HARQ processing number HPNO-3. An initial transmission multicast TB can be identified by HPN field and G-RNTI for the DCI to schedule the initial transmission of the multicast TB.

For re-transmission of the same multicast TB, the retransmission is scheduled by a DCI carried on UE-specific PDCCH, such that the CRC of the DCI is scrambled by a UE-specific RNTI (i.e., C-RNTI). Then, the UE will combine the initial transmission and the re-transmission of the same multicast TB. However, it is important to indicate that the initial transmission and the re-transmission correspond to the same multicast TB, which can be accomplished according to one of the following methods.

In a first method for the sixth embodiment, a sub-range of HPN in DCI with CRC scrambled with C-RNTI are defined as corresponding with a multicast TB or multicast services. That is, if the value of HPN in DCI with CRC scrambled with C-RNTI is located within the sub-range, then the scheduled TB is a multicast TB. In defining the relationship between a 'value of HPN and G-RNTI for initial transmission scheduling DCI' and a 'HPN in re-transmission scheduling DCI,' the relationship can be configured by RRC signaling or defined in the specification. Further, the index of multicast service and corresponding G-RNTI can be configured by RRC signaling. For example, if there are multicast services and the sub-range of HPN corresponding with a multicast TB is {HPN #8-#15}, for a 4-bits HPN, the value of the sub-range of HPN is 11000-11111 and the relationship can be defined as shown in FIG. 9.

FIG. 9 is a table for values of scheduling DCI relative to multicast services indexes, according to various embodiments. As shown in FIG. 9, an initial transmission TB with G-RNTI #1 and HPN #0 corresponds to a retransmission TB with HPN #8, an initial transmission TB with G-RNTI #1 and HPN #1 corresponds to a retransmission TB with HPN #9, an initial transmission TB with G-RNTI #1 and HPN #2 corresponds to a retransmission TB with HPN #10, an initial transmission TB with G-RNTI #1 and HPN #3 corresponds to a retransmission TB with HPN #11, an initial transmission TB with G-RNTI #2 and HPN #0 corresponds to a retransmission TB with HPN #12, an initial transmission TB with G-RNTI #2 and HPN #1 corresponds to a retransmission TB with HPN #13, an initial transmission TB with G-RNTI #2 and HPN #2 corresponds to a retransmission TB with HPN #14, and an initial transmission TB with G-RNTI #2 and HPN #3 corresponds to a retransmission TB with HPN #15. Further, HPN #0-#7 will be used for scheduling unicast TB. Then, if a UE receives a DCI with CRC scrambled with C-RNTI and HPN not used for unicast TB, the scheduled TB is a multicast TB. In some embodiments, the value of New Data Indicator (NDI) field in the DCI for scheduling retransmission of a multicast TB is not toggled in comparison with the NDI field in the DCI for scheduling initial transmission of the multicast TB.

In a second method for the sixth embodiment, a Service Type Indication (STI) field in the scheduling DCI with CRC scrambled by C-RNTI is defined for indicating to which service type the scheduled TB belongs. That is, the STI field will indicate whether the scheduled TB is a unicast TB or a multicast TB, and, if multicast, to which multicast service the TB belongs. Further, the relationship between configuration index and RNTI of the DCI for initial transmission scheduling is configured via RRC signaling. For example, configuration index #0 (i.e., value '00' for STI field in the DCI) corresponding to C-RNTI such that a unicast TB is scheduled. Configuration index #1 (i.e., value '01' for STI field in the DCI) corresponding to G-RNTI #1, such that a multicast TB belonging to multicast service #1 is scheduled. Configuration index #2 (i.e., value '10' for STI field in the DCI) corresponding to G-RNTI #2, such that a multicast TB belonging to multicast service #2 is scheduled. In some embodiments, the value of HPN field in DCI with CRC scrambled by C-RNTI for re-transmission equals to the value of HPN in DCI for initial transmission of the multicast TB.

FIG. 10 is a table for values of scheduling DCI relative to service type, according to various embodiments. As shown in FIG. 10, an initial transmission TB with G-RNTI #1 and HPN #0 corresponds to a retransmission TB with STI #1 and HPN #0 in the scheduling DCI, an initial transmission TB with G-RNTI #1 and HPN #1 corresponds to a retransmission TB with STI #1 and HPN #1 in the scheduling DCI, an initial transmission TB with G-RNTI #1 and HPN #2 corresponds to a retransmission TB with STI #1 and HPN #2 in the scheduling DCI, an initial transmission TB with G-RNTI #1 and HPN #3 corresponds to a retransmission TB with STI #1 and HPN #3 in the scheduling DCI, an initial transmission TB with G-RNTI #2 and HPN #0 corresponds to a retransmission TB with STI #2 and HPN #0 in the scheduling DCI, an initial transmission TB with G-RNTI #2 and HPN #1 corresponds to a retransmission TB with STI #2 and HPN #1 in the scheduling DCI, an initial transmission TB with G-RNTI #2 and HPN #2 corresponds to a retransmission TB with STI #2 and HPN #2 in the scheduling DCI, and an initial transmission TB with G-RNTI #2 and HPN #3 corresponds to a retransmission TB with STI #2 and HPN #3 in the scheduling DCI. In some embodiments, the STI field can be used for directly indicating Temporary Mobile Group Identity (TMGI) or G-RNTI of the multicast service.

In a third method for the sixth embodiment, a Single-bit Service Type Indication (SSTI) field is defined for indicating the attribute of a scheduled TB, such that the scheduled TB is a multicast TB or a unicast TB. Alternatively, the indication field is used for indicating the purpose of scheduling DCI, such that the DCI is used for scheduling a multicast TB or a unicast TB. More specifically, value '0' of SSTI field represents that a unicast TB is scheduled, and value '1' of SSTI field represents that a multicast TB is scheduled. Further, a Multicast Service Indication (MSI) field in the scheduling DCI with CRC scrambled by C-RNTI may be defined for indicating to which multicast service the scheduled TB belongs. If the scheduled TB is a unicast TB, the MSI field will be reserved.

For those cases in which the MSI field indicates the configuration index of multicast service, the relationship between configuration index and G-RNTI is configured RRC signaling. For example, multicast service index #1 (i.e., value '00' for MSI field in the DCI) corresponds to G-RNTI #1, multicast service index #2 (i.e., value '01' for MSI field in the DCI) corresponds to G-RNTI #2, etc. However, no value is reserved for indicating that a unicast TB is scheduled.

For those cases in which a multicast TB is scheduled, the value of HPN field in DCI with CRC scrambled by C-RNTI for re-transmission is equal to the value of HPN in DCI for initial transmission of the multicast TB. FIG. 11 is a table for values of scheduling DCI relative to multicast services index, according to various embodiments. As shown in FIG. 11, an initial transmission TB with G-RNTI #1 and HPN #0 corresponds to a retransmission TB with MSI #1 and HPN #0 in the scheduling DCI. An initial transmission TB with G-RNTI #1 and HPN #1 corresponds to a retransmission TB with MSI #1 and HPN #1 in the scheduling DCI, an initial transmission TB with G-RNTI #1 and HPN #2 corresponds to a retransmission TB with MSI #1 and HPN #2 in the scheduling DCI, an initial transmission TB with G-RNTI #1 and HPN #3 corresponds to a retransmission TB with MSI #1 and HPN #3 in the scheduling DCI, an initial transmission TB with G-RNTI #2 and HPN #0 corresponds to a retransmission TB with MSI #2 and HPN #0 in the scheduling DCI, an initial transmission TB with G-RNTI #2 and HPN #1 corresponds to a retransmission TB with MSI #2 and HPN #1 in the scheduling DCI, an initial transmission TB with G-RNTI #2 and HPN #2 corresponds to a retransmission TB with MSI #2 and HPN #2 in the scheduling DCI, and an initial transmission TB with G-RNTI #2 and HPN #3 corresponds to a retransmission TB with MSI #2 and HPN #3 in the scheduling DCI. In some embodiments, the MSI field can be used for directly indicating TMGI or G-RNTI of the multicast service. In other embodiments, the value of the NDI field in the DCI for scheduling re-transmission of a multicast TB is not toggled in comparison with the NDI field in the DCI for scheduling initial transmission of the multicast TB.

FIG. 12A is a flowchart diagram illustrating an example wireless communication method 1200a, according to various arrangements. Referring to FIGS. 1-8, the method 1200 can be performed by a UE. Method 1200 begins at 1210 where the UE receives, from a BS, first downlink control information on a first downlink channel, which is specific to the UE, in a first frequency resource. The first downlink control information schedules a first TB.

At 1220, the UE receives the first TB on a second downlink channel, which is common to a group of UEs, in second frequency resource. The first TB is received by the group of UEs. The method 1200a is expanded upon in method 600 of FIG. 6. Method 600 describes an embodiment of method 1200a in which the BS transmits additional downlink control information (in 630 and 650) that is received by the UE (in 640 and 660).

In some examples, the first downlink control information includes a DCI. The first downlink channel is a PDCCH. The second downlink channel is a PDSCH. The first frequency resource is a first BWP. The second frequency resource is a second BWP.

In some examples as described in further detail in the method 300, the first downlink control information includes a BWP indicator indicating a value, and in response to determining that the value is a predetermined value, the wireless communication device (1) determines that no BWP switching is needed from receiving the first downlink control information in the first frequency resource and receiving the first TB in the second frequency resource; and/or (2) determining that no BWP switching delay is between receiving the first downlink control information in the first frequency resource and receiving the first TB in the second frequency resource. In some of these examples, receiving the first TB on the second downlink channel in the second frequency resources includes determining configurations of the second downlink resource according to the second frequency resource. In others of these examples, an RNTI is used for initializing a scrambling sequence of the second downlink channel is either specific to the second frequency resource or shared by all multicast services. In further of these examples, the second frequency resource is within the first frequency resource, and the first and second frequency resources have a same CP and SCS.

In some examples as described in further detail in the method 400, the UE determines a size for the first downlink control information according to configurations of the first frequency resource.

In some examples as described in further detail in the method 500, the UE determines a first size, corresponding to scheduling a unicast downlink resource, for each of the formats of the first downlink control information according to configurations of the first frequency resource. The UE also determines a second size, corresponding to scheduling a multicast downlink resource, for each of the formats of the first downlink control information according to configurations of the second frequency resource, and then aligns the first and second sizes. In some of these examples, aligning the first and second sizes includes one of: (1) aligning the first size for one of the formats with the second size for the same format; (2) aligning the second size for one of the formats with the first size for the same format; (3) aligning each of the first size and the second size with a maximum size for the same format; or (4) in response to determining that a number of the formats with different sizes exceeds a size budget, aligning the first size and the second size using one of (1), (2), or (3).

In some examples as described in further detail in the method 800, the first frequency resource is paired with a third frequency resource, both of which are used for unicast services, and the second frequency resource is paired with a fourth frequency resource, both of which are used for multicast services. Further, the UE switches from the first frequency resource to the third frequency resource, and determines whether the second frequency resource is within the third frequency resource. If the second frequency resource is within the third frequency resource, the UE uses the second frequency resource for the multicast services. If at least a portion of the second frequency resource is not within the third frequency resource, the UE switches to the fourth frequency resource for multicast services. In some of these examples, in response to determining that the first frequency resource is switched to the third frequency resource, the UE switches from the second frequency resource to the fourth frequency resource for multicast services. In other of these examples, the UE receives second downlink information, which schedules a first TB, on a third downlink channel common to a group of UEs. The UE then adopts, by default, continuous FDRA for the second downlink channel.

In further of these examples, the UE continuously monitors the first downlink channel in the first frequency resource if at least one the following conditions is true: (1) the second frequency resource is within the first frequency resource; (2) a subcarrier spacing of the second frequency resource is same as a subcarrier spacing of the first frequency resource; (3) a Cyclic Prefix (CP) type of the second frequency resource is same as a CP type of the first frequency resource; (4) a center frequency of the second frequency resource is same as a center frequency of the first frequency resource; and (5) a bandwidth of the second frequency resource is same as a bandwidth of the first frequency resource. If any one of the above is false, the UE monitors a third downlink channel in the second frequency resource.

In some examples as described in further detail in method 600, the UE receives second downlink information, which schedules a unicast TB, on a third downlink channel, and a third downlink information, which schedules a second multicast TB, on a fourth downlink channel that is common to a group of UEs. Here, the formats of the second downlink information are resued as formats of the third downlink information. In some of these examples, the UE further performs at least one of: (1) aligning a size of the second downlink information with a size of the third downlink information; (2) aligning a size of the second downlink information and the size of the third downlink information with a reference size; or (3) in response to determining that a number of the formats with different sizes exceeds a size budget, aligning the size of the second downlink information and the size of the third downlink information using either (1) or (2).

FIG. 12B is a flowchart diagram illustrating an example wireless communication method 1200*b*, according to various arrangements. Referring to FIGS. 1-8, the method 1200*b* can be performed by a BS. The method 1200*b* begins at 1230, where the BS transmits, to a UE, first downlink control information on a first downlink channel, which is specific to the UE, in a first frequency resource. The first downlink control information schedules a first TB. Then, at 1240, the BS transmits, to a group of UEs, the first TB on a second downlink channel, which is common to the group of UEs, in a second frequency resource.

In some examples, the first downlink control information includes a DCI. The first downlink channel is a PDCCH. The second downlink channel is a PDSCH. The first frequency resource is a first BWP. The second frequency resource is a second BWP.

In some examples, the first downlink information comprises a BWP indicator indicating a value, which indicates whether BWP switching is needed by the UE from receiving the first downlink control information in the first frequency resource and receiving the first TB in the second frequency resource, or whether a BWP switching delay is to be applied by the UE between receiving the first downlink control information in the first frequency resource and receiving the first TB in the second frequency resource.

In some examples, an RNTI is used for initializing a scrambling sequence of the second downlink channel is either specific to the second frequency resource or shared by all multicast services. In other examples, the second frequency resource is within the first frequency resource, and the first and second frequency resources have a same CP and SCS.

Figure 13B:
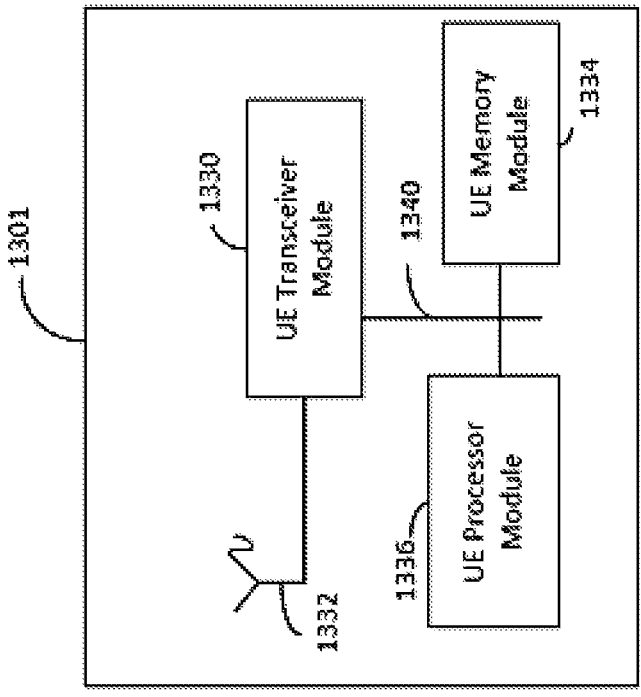
FIG. 13B illustrates a block diagram of an example user equipment, according to various arrangements.
Figure 13A:
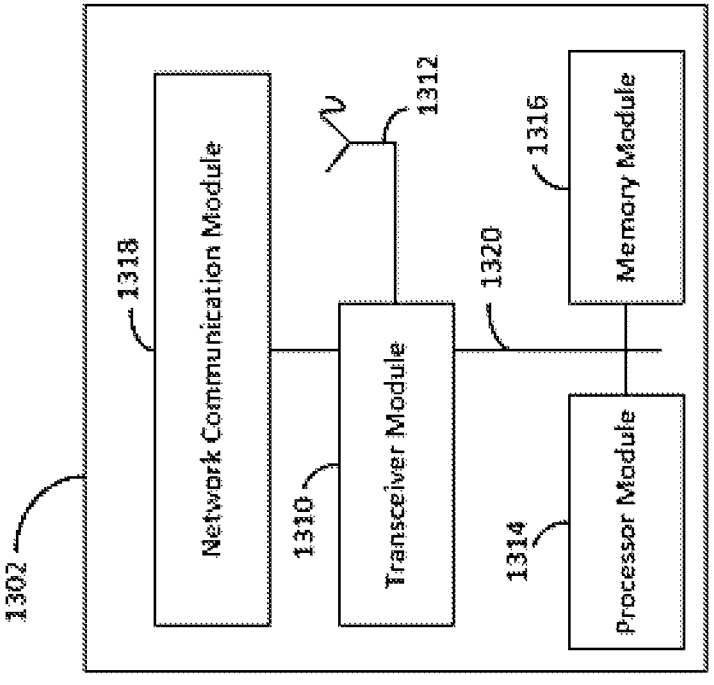
FIG. 13A illustrates a block diagram of an example base station, according to various arrangements.

FIG. 13A illustrates a block diagram of an example BS 1302, in accordance with some embodiments of the present disclosure. FIG. 13B illustrates a block diagram of an example UE 1301, in accordance with some embodiments of the present disclosure. Referring to FIGS. 1-12B, the UE 1301 (e.g., a wireless communication device, a terminal, a mobile device, a mobile user, and so on) is an example implementation of the UEs described herein, and the BS 1302 is an example implementation of the BS described herein.

The BS 1302 and the UE 1301 can include components and elements configured to support known or conventional operating features that need not be described in detail herein. In one illustrative embodiment, the BS 1302 and the UE 1301 can be used to communicate (e.g., transmit and receive) data symbols in a wireless communication environment, as described above. For instance, the BS 1302 can be a BS (e.g., gNB, eNB, and so on), a server, a node, or any suitable computing device used to implement various network functions.

The BS 1302 includes a transceiver module 1310, an antenna 1312, a processor module 1314, a memory module 1316, and a network communication module 1318. The module 1310, 1312, 1314, 1316, and 1318 are operatively coupled to and interconnected with one another via a data communication bus 1320. The UE 1301 includes a UE transceiver module 1330, a UE antenna 1332, a UE memory module 1334, and a UE processor module 1336. The modules 1330, 1332, 1334, and 1336 are operatively coupled to and interconnected with one another via a data communication bus 1340. The BS 1302 communicates with the UE 1301 or another BS via a communication channel, which can be any wireless channel or other medium suitable for transmission of data as described herein.

As would be understood by persons of ordinary skill in the art, the BS 1302 and the UE 1301 can further include any number of modules other than the modules shown in FIGS. 13A and 13B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 1330 includes a radio frequency (RF) transmitter and a RF receiver each including circuitry that is coupled to the antenna 1332. A duplex switch (not shown) may alternatively couple the RF transmitter or receiver to the antenna in time duplex fashion. Similarly, in accordance with some embodiments, the transceiver 1310 includes an RF transmitter and a RF receiver each having circuitry that is coupled to the antenna 1312 or the antenna of another BS. A duplex switch may alternatively couple the RF transmitter or receiver to the antenna 1312 in time duplex fashion. The operations of the two-transceiver modules 1310 and 1330 can be coordinated in time such that the receiver circuitry is coupled to the antenna 1332 for reception of transmissions over a wireless transmission link at the same time that the transmitter is coupled to the antenna 1312. In some embodiments, there is close time synchronization with a minimal guard time between changes in duplex direction.

The UE transceiver 1330 and the transceiver 1310 are configured to communicate via the wireless data communication link, and cooperate with a suitably configured RF antenna arrangement 1312/1332 that can support a particular wireless communication protocol and modulation scheme. In some illustrative embodiments, the UE transceiver 1330 and the transceiver 1310 are configured to support industry standards such as the Long Term Evolution (LTE) and emerging 5G standards, and the like. It is understood, however, that the present disclosure is not necessarily limited in application to a particular standard and associated protocols. Rather, the UE transceiver 1330 and the BS transceiver 1310 may be configured to support alternate, or additional, wireless data communication protocols, including future standards or variations thereof.

The transceiver 1310 and the transceiver of another BS (such as but not limited to, the transceiver 1310) are configured to communicate via a wireless data communication link, and cooperate with a suitably configured RF antenna arrangement that can support a particular wireless communication protocol and modulation scheme. In some illustrative embodiments, the transceiver 1310 and the transceiver of another BS are configured to support industry standards such as the LTE and emerging 5G standards, and the like. It is understood, however, that the present disclosure is not necessarily limited in application to a particular standard and associated protocols. Rather, the transceiver 1310 and the transceiver of another BS may be configured to support alternate, or additional, wireless data communication protocols, including future standards or variations thereof.

In accordance with various embodiments, the BS 1302 may be a BS such as but not limited to, an eNB, a serving eNB, a target eNB, a femto station, or a pico station, for example. The BS 1302 can be an RN, a DeNB, or a gNB. In some embodiments, the UE 1301 may be embodied in various types of user devices such as a mobile phone, a smart phone, a personal digital assistant (PDA), tablet, laptop computer, wearable computing device, etc. The processor modules 1314 and 1336 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 1314 and 1336, respectively, or in any practical combination thereof. The memory modules 1316 and 1334 may be realized as RAM memory, flash memory, ROM memory, EPROM memory, EEPROM memory, registers, a hard disk, a removable disk, a CD-ROM, or any other form of storage medium known in the art. In this regard, memory modules 1316 and 1334 may be coupled to the processor modules 1314 and 1336, respectively, such that the processors modules 1314 and 1336 can read information from, and write information to, memory modules 1316 and 1334, respectively. The memory modules 1316 and 1334 may also be integrated into their respective processor modules 1314 and 1336. In some embodiments, the memory modules 1316 and 1334 may each include a cache memory for storing temporary variables or other intermediate information during execution of instructions to be executed by processor modules 1314 and 1336, respectively. Memory modules 1316 and 1334 may also each include non-volatile memory for storing instructions to be executed by the processor modules 1314 and 1336, respectively.

The network communication module 1318 generally represents the hardware, software, firmware, processing logic, and/or other components of the BS 1302 that enable bidirectional communication between the transceiver 1310 and other network components and communication nodes in communication with the BS 1302. For example, the network communication module 1318 may be configured to support internet or WiMAX traffic. In a deployment, without limitation, the network communication module 1318 provides an 802.3 Ethernet interface such that the transceiver 1310 can communicate with a conventional Ethernet based computer network. In this manner, the network communication module 1318 may include a physical interface for connection to the computer network (e.g., Mobile Switching Center (MSC)). In some embodiments, the network communication module 1318 includes a fiber transport connection configured to connect the BS 1302 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
receiving, by a wireless communication device from a network, first downlink control information on a first downlink channel in a first frequency resource; wherein the first downlink control information schedules a first Transport Block (TB), and the first downlink channel is specific to the wireless communication device; and
receiving, by the wireless communication device from the network, the first TB on a second downlink channel in a second frequency resource, wherein the first TB is received by a plurality of wireless communication devices, and the second downlink channel is common to the plurality of wireless communication devices.

2. The method of claim 1, wherein
the first downlink control information comprises a Downlink Control Information (DCI);
the first downlink channel is a Physical Downlink Control Channel (PDCCH);
the second downlink channel is a Physical Downlink Shared Channel (PDSCH);
the first frequency resource is a first Bandwidth Part (BWP); and
the second frequency resource is a second BWP.

3. The method of claim 1, wherein
the first downlink control information comprises a BWP indicator indicating a value; and
the method further comprises, in response to determining that the value is a predetermined value:
determining, by the wireless communication device, that no BWP switching is needed from receiving the first downlink control information in the first frequency resource and receiving the first TB in the second frequency resource; or
determining, by the wireless communication device, that no BWP switching delay is between receiving the first downlink control information in the first frequency resource and receiving the first TB in the second frequency resource.

4. The method of claim 1, wherein receiving the first TB on the second downlink channel in the second frequency resource comprises determining configurations of a second downlink resource according to the second frequency resource.

5. The method of claim 1, wherein
the second frequency resource is within the first frequency resource; and
the first frequency resource and the second frequency resource have a same Cyclic Prefix (CP) and a same subcarrier spacing (SCS).

6. The method of claim 1, further comprising determining, by the wireless communication device, a size for the first downlink control information according to configurations of the first frequency resource.

7. The method of claim 1, further comprising:
determining, by the wireless communication device, a first size for each of formats of the first downlink control information according to configurations of the first frequency resource, the first size corresponding to scheduling unicast downlink resource;
determining, by the wireless communication device, a second size for each of the formats of the first downlink control information according to configurations of the second frequency resource, the second size correspond-
ing to scheduling multicast downlink resource; and
aligning, by the wireless communication device, the first
size and the second size.

8. The method of claim 7, wherein aligning the first size
and the second size comprises one of:
    (1) aligning the first size for one of the formats with the
        second size for the same format;
    (2) aligning the second size for one of the formats with the
        first size for the same format;
    (3) aligning each of the first size and the second size with
        a maximum size for the same format; or
    (4) in response to determining that a number of the
        formats with different sizes exceeds a size budget,
        aligning the first size and the second size using one of
        (1), (2), or (3).

9. The method of claim 1, wherein
the first frequency resource and a third frequency resource
    are used for unicast services;
the second frequency resource and a fourth frequency
    resource are used for multicast services; and
the method further comprises:
    switching from the first frequency resource to the third
        frequency resource for the unicast services;
    in response to determining that the second frequency
        resource is within the third frequency resource,
        using, by the wireless communication device, the
        second frequency resource for the multicast services;
        and
    in response to determining that at least a portion of the
        second frequency resource is not within the third
        frequency resource, switching, by the wireless com-
        munication device, from the second frequency
        resource to the fourth frequency resource for the
        multicast services, wherein, the fourth frequency
        resource is within the third frequency resource.

10. The method of claim 1, wherein
the first frequency resource and a third frequency resource
    are used for unicast services;
the second frequency resource and a fourth frequency
    resource are used for multicast services; and
the method further comprises:
    in response to determining that the first frequency
        resource is switched to the third frequency resource
        for the unicast service, switching, by the wireless
        communication device, from the second frequency
        resource to the fourth frequency resource for the
        multicast services.

11. The method of claim 1, further comprising continu-
ously monitoring, by the wireless communication device,
the first downlink channel in the first frequency resource in
response to determining at least one of:
    the second frequency resource is within the first frequency
        resource;
    a subcarrier spacing of the second frequency resource is
        same as a subcarrier spacing of the first frequency
        resource;
    a Cyclic Prefix (CP) type of the second frequency
        resource is same as a CP type of the first frequency
        resource;

a center frequency of the second frequency resource is
        same as a center frequency of the first frequency
        resource; or
    a bandwidth of the second frequency resource is same as
        a bandwidth of the first frequency resource.

12. A wireless communication device, comprising:
at least one processor configured to:
    receiving, via a receiver from a network, first downlink
        control information on a first downlink channel in a
        first frequency resource; wherein the first downlink
        control information schedules a first Transport Block
        (TB), and the first downlink channel is specific to the
        wireless communication device; and
    receiving, via the receiver from the network, the first
        TB on a second downlink channel in a second
        frequency resource, wherein the first TB is received
        by a plurality of wireless communication devices,
        and the second downlink channel is common to the
        plurality of wireless communication devices.

13. A network device, comprising:
at least one processor configured to:
    transmit, via a transmitter to a wireless communication
        device, first downlink control information on a first
        downlink channel in a first frequency resource,
        wherein the first downlink control information
        schedules a first Transport Block (TB), and the first
        downlink channel is specific to the wireless commu-
        nication device; and
    transmit, via the transmitter to a plurality of wireless
        communication devices comprising the wireless
        communication device, the first TB on a second
        downlink channel in a second frequency resource,
        wherein the second downlink channel is common to
        the plurality of wireless communication devices.

14. A wireless communication method, comprising:
transmitting, by a network to a wireless communication
    device, first downlink control information on a first
    downlink channel in a first frequency resource, wherein
    the first downlink control information schedules a first
    Transport Block (TB), and the first downlink channel is
    specific to the wireless communication device; and
transmitting, by the network to a plurality of wireless
    communication devices comprising the wireless com-
    munication device, the first TB on a second downlink
    channel in a second frequency resource, wherein the
    second downlink channel is common to the plurality of
    wireless communication devices.

15. The method of claim 14, wherein
the first downlink control information comprises a Down-
    link Control Information (DCI);
the first downlink channel is a Physical Downlink Control
    Channel (PDCCH);
the second downlink channel is a Physical Downlink
    Shared Channel (PDSCH);
the first frequency resource is a first Bandwidth Part (BWP);
and
    the second frequency resource is a second BWP.

* * * * *